(12) United States Patent
Sakaguchi

(10) Patent No.: US 10,844,952 B2
(45) Date of Patent: Nov. 24, 2020

(54) SHIFT RANGE CONTROL APPARATUS

(71) Applicant: DENSO CORPORATION, Kariya (JP)

(72) Inventor: Koji Sakaguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/542,464

(22) Filed: Aug. 16, 2019

(65) Prior Publication Data

US 2019/0368602 A1    Dec. 5, 2019

Related U.S. Application Data

(63) Continuation of application No. PCT/JP2018/005707, filed on Feb. 19, 2018.

(30) Foreign Application Priority Data

Feb. 28, 2017 (JP) .................. 2017-036099

(51) Int. Cl.
| | | |
|---|---|---|
| *F16H 61/02* | (2006.01) | |
| *B60W 30/19* | (2012.01) | |
| *F16H 59/10* | (2006.01) | |
| *F16H 61/28* | (2006.01) | |
| *G06N 20/00* | (2019.01) | |
| *F16H 59/02* | (2006.01) | |

(52) U.S. Cl.
CPC ......... *F16H 61/0204* (2013.01); *B60W 30/19* (2013.01); *F16H 59/105* (2013.01); *F16H 61/28* (2013.01); *F16H 2059/0221* (2013.01); *G06N 20/00* (2019.01)

(58) Field of Classification Search
CPC ...... F16H 61/0204; F16H 61/28; F16H 61/12; F16H 2061/0087; F16H 2061/2823; F16H 2061/283; F16H 2061/2838; F16H 2061/326; F16H 2342/02
See application file for complete search history.

(56) References Cited

U.S. PATENT DOCUMENTS

| | | | |
|---|---|---|---|
| 2005/0156550 A1* | 7/2005 | Kamio | ............ F16H 61/32 318/445 |
| 2006/0096398 A1* | 5/2006 | Stengel | ............ F16H 61/28 74/335 |
| 2010/0294066 A1* | 11/2010 | Itazu | ............ F16H 63/3416 74/473.12 |
| 2015/0000449 A1 | 1/2015 | Sakaguchi et al. | |
| 2016/0102761 A1* | 4/2016 | Kuwahara | ............ F16H 61/28 74/473.12 |

* cited by examiner

*Primary Examiner* — Edwin A Young
(74) *Attorney, Agent, or Firm* — Nixon & Vanderhye P.C.

(57) ABSTRACT

A shift range control apparatus switches a shift range by controlling a motor and is applied to a vehicle shift-by-wire system. The shift range control apparatus is configured to: switch an energization phase of a motor for one step of a predetermined energization pattern to one rotation direction or a different rotation direction of the motor in a control for learning a play decrease angle; determine whether a detection value of the output shaft sensor has changed; and learn, as the play decrease angle, an angle of the motor shaft when it is determined that the detection value of the output shaft sensor has changed.

9 Claims, 13 Drawing Sheets

SHIFT RANGE CONTROL APPARATUS

CROSS REFERENCE OF RELATED APPLICATION

The present application is a continuation application of International Patent Application No. PCT/JP2018/005707 filed on Feb. 19, 2018, which designated the U.S. and claims the benefit of priority from Japanese Patent Application No. 2017-36099 filed on Feb. 28, 2017. The entire disclosures of all of the above applications are incorporated herein by reference.

TECHNICAL FIELD

The present disclosure relates to a shift range control apparatus.

BACKGROUND

A shift range control apparatus switches a shift range by controlling a motor of a rotary actuator of a shift-by-wire system.

SUMMARY

The present disclosure may provide a shift range control apparatus that switches a shift range by controlling a motor and is applied to a vehicle shift-by-wire system. The shift range control apparatus is configured to: switch an energization phase of a motor for one step of a predetermined energization pattern to one rotation direction or a different rotation direction of the motor in a control for learning a play decrease angle; determine whether a detection value of the output shaft sensor has changed; and learn, as the play decrease angle, an angle of the motor shaft when it is determined that the detection value of the output shaft sensor has changed.

BRIEF DESCRIPTION OF DRAWINGS

The above and other objects, features, and advantages of the present disclosure will become more apparent from the following detailed description with reference to the accompanying drawings. In the drawings.

DETAILED DESCRIPTION

Figure 1:
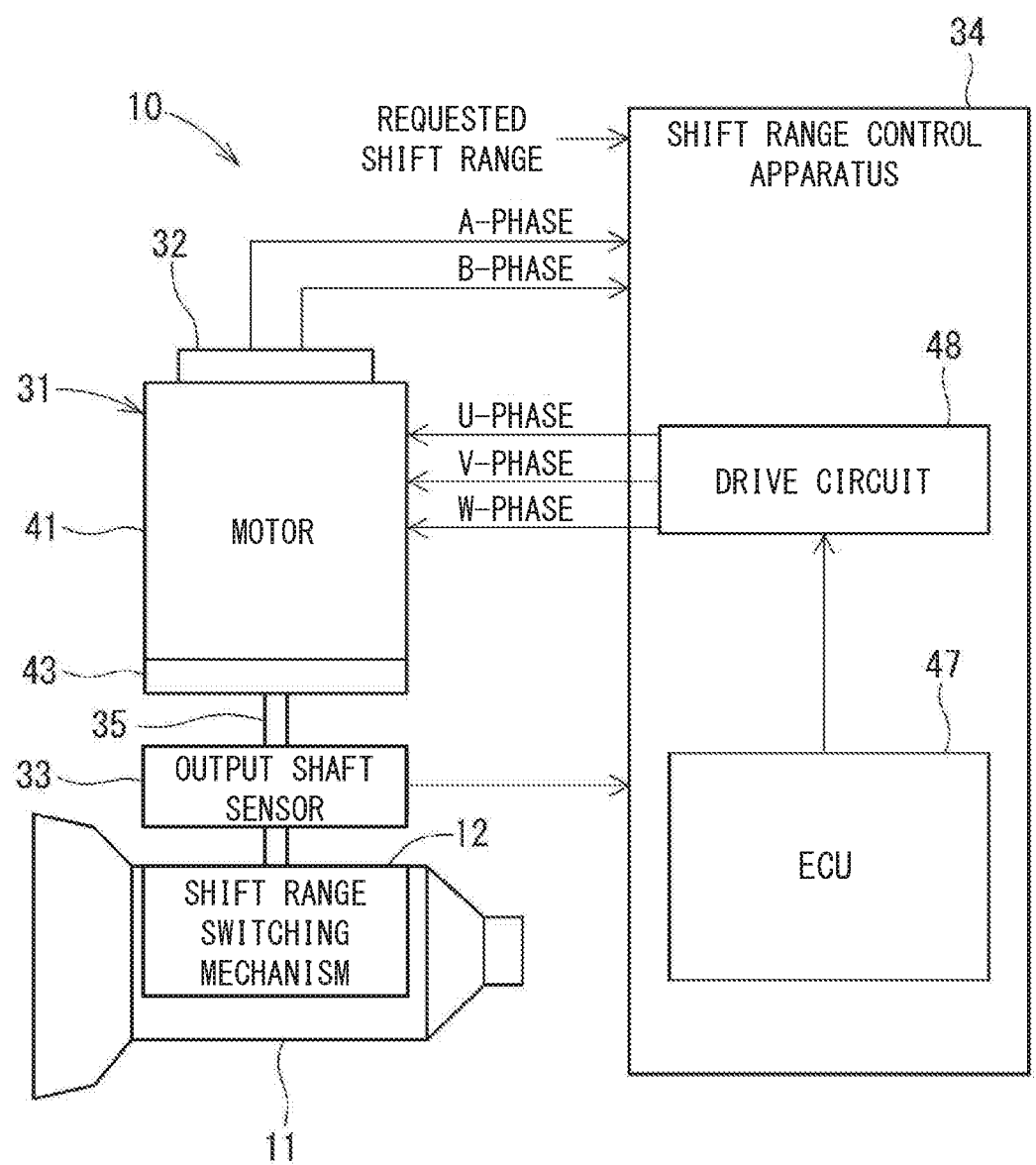
FIG. 1 is a diagram explaining a shift-by-wire system to which a shift range control apparatus according to a first embodiment is applied.

A shift range control apparatus learns a play width of a rotation transmission system from a motor shaft to an output shaft of a rotary actuator. The shift range control apparatus detects, as a play decrease angle, an encoder count value obtained when a detection value of an output shaft sensor starts to change during rotation of a motor in a manner similar to the manner of rotation of the motor at shift range switching.

According to a related art, a play decrease angle is detected by rotating the motor in a manner similar to the manner of rotation of the motor at shift range switching. In this case, the encoder count value, which is obtained based on determination that the detection value of the output shaft sensor has changed, may be different from an actual play decrease position in the presence of vibration, twist, or the like of the rotation transmission system. Accordingly, detection accuracy of the play decrease angle may deteriorate.

The present disclosure provides a shift range control apparatus capable of increasing detection accuracy of a play decrease angle.

A shift range control apparatus according to one aspect of the present disclosure is applied to a vehicle shift-by-wire system that includes a rotary actuator connected to a shift range switching mechanism, a motor shaft sensor detecting an angle of a motor shaft of a motor of the rotary actuator, and an output shaft sensor detecting an angle of an output shaft of the rotary actuator. The shift range control apparatus may include a step energization section, a play decrease determination section, and a play learning section.

The step energization section may switch an energization phase of the motor for one step of the predetermined energization pattern to one rotation direction or the other rotation direction of the motor in control for learning a play decrease angle, which is an angle when play of the rotation transmission system from the motor shaft to the output shaft decreases.

The play decrease determination section may determine whether a detection value of the output shaft sensor has changed by a predetermined value or larger before and after switching of the energization phase by the step energization section when a predetermined time elapses from the switching of the energization phase, or when swings of a detection value of the motor shaft sensor or the output shaft sensor converge.

When the play decrease determination section determines that the detection value of the output shaft sensor has changed by the predetermined value or larger before and after the switching of the energization phase, the play learning section may learn an angle of the motor shaft at that time as a play decrease angle.

A change of the detection value of the output shaft sensor is checked after switching of the energization phase of the motor for one step of the energization pattern and convergence of swings of the rotation transmission system. In this case, the play decrease angle may be accurately detectable for each step of the energization pattern. It may be possible to detect a play decrease angle with accuracy of motor resolution when one step of the energization pattern corresponds to motor resolution. Accordingly, it may be possible to improve detection accuracy of play decrease angles.

Multiple embodiments will be hereinafter described with reference to the drawings. In the respective embodiments, substantially identical components are given identical reference numerals, and are not repeatedly explained.

First Embodiment

A shift range control apparatus according to a first embodiment is applied to a shift-by-wire system of a vehicle. As shown in FIG. 1, a shift-by-wire system 10 is a system which operates a shift range switching mechanism 12 mounted on an automatic transmission 11.

(Shift Range Switching Mechanism)

Figure 2:
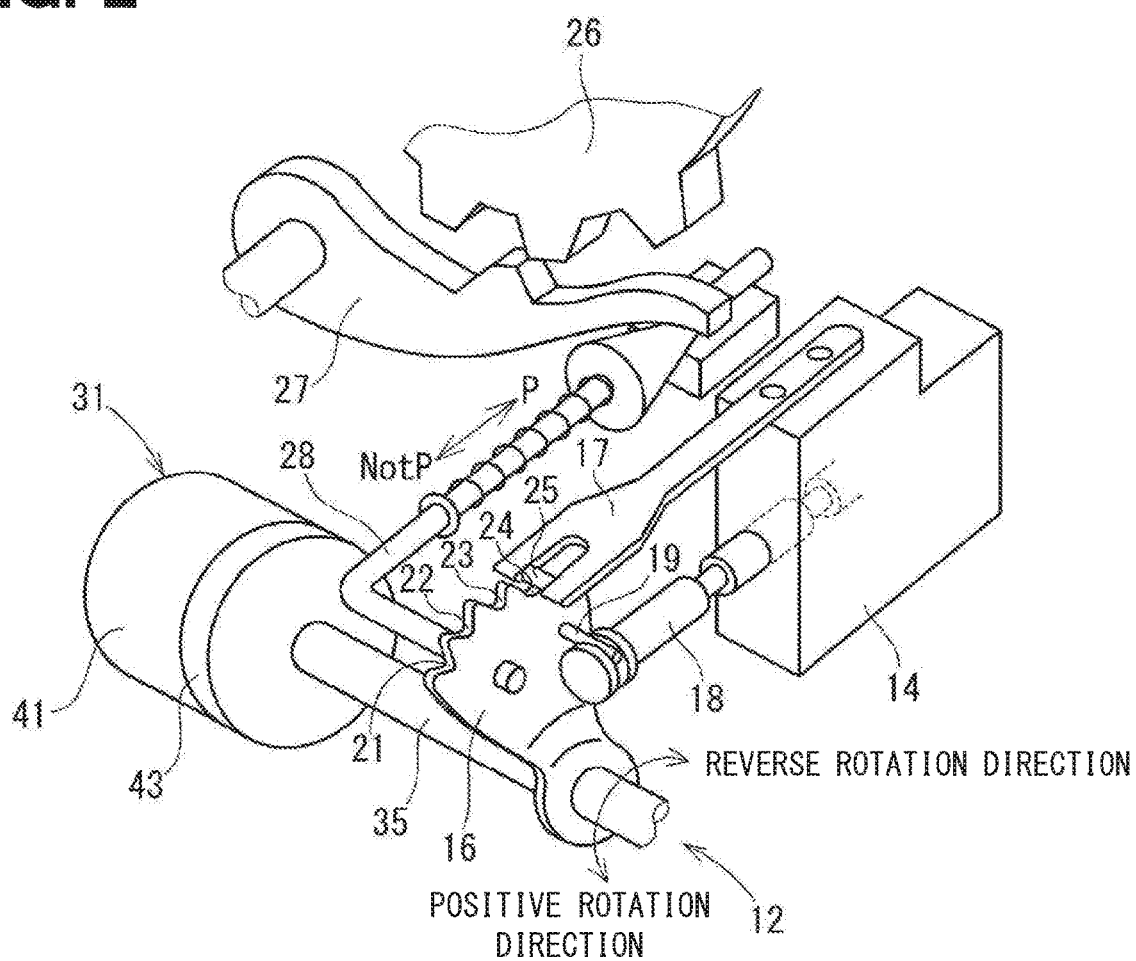
FIG. 2 is a perspective view of a shift range switching mechanism in FIG. 1.

The shift range switching mechanism 12 will be described with reference to FIG. 2.

The shift range switching mechanism 12 is a mechanism which changes an operation position of a range switching valve 14 included in a hydraulic control circuit of the automatic transmission 11 to switch a shift range, and includes a detent plate 16, a detent spring 17, and others.

The detent plate 16 is fixed to an output shaft 35 of a rotary actuator 31 of the shift-by-wire system 10. A component included in rotational movement of the detent plate 16, which is a component in an axial direction of a spool 18 of the range switching valve 14, is transmitted to the spool 18 via a pin 19. An outer edge of the detent plate 16 includes a recess 21, a recess 22, a recess 23, and a recess 24 in this order in a rotation direction.

One end of the detent spring 17 is fixed to a fixing member of the automatic transmission 11. The other end of the detent spring 17 includes an engaging portion 25. The engaging portion 25 is pressed against the outer edge of the detent plate 16 by an urging force of the detent spring 17. When a rotational force equal to or larger than a predetermined force is applied to the detent plate 16, the detent spring 17 is elastically deformed. As a result, the engaging portion 25 shifts through the recesses 21 to 24. The operation position of the range switching valve 14 is held by engagement between the engaging portion 25 and one of the recesses 21 to 24. The recess 21 corresponds to a parking range. The recess 22 corresponds to a reverse range. The recess 23 corresponds to a neutral range. The recess 24 corresponds to a drive range.

The shift range switching mechanism 12 further includes a park gear 26, a park pole 27, and a park rod 28 as components constituting a parking lock. The park gear 26 rotates with the output shaft of the automatic transmission 11 as one body. The park pole 27 is so provided as to be movable close to and away from the park gear 26, and locks the park gear 26 and the rotation shaft of the automatic transmission 11 when coming close to and engaging with the park gear 26. The park rod 28 brings the park pole 27 into engagement with the park gear 26 in the parking range, and brings the park pole 27 and the park gear 26 into disengagement from each other in the non-parking range.

(Shift-by-Wire System)

The shift-by-wire system 10 will be now described with reference to FIG. 1.

As shown in FIG. 1, the shift-by-wire system 10 includes the rotary actuator 31, an encoder 32, an output shaft sensor 33, and a shift range control apparatus 34.

The rotary actuator 31 includes a motor 41 constituted by a DC brushless motor or a switched reluctance motor, for example, and a speed reducer 43 for reducing a rotation speed of the motor 41 and outputting rotation of the motor 41 from the output shaft 35. The motor 41 includes a stator having multi-phase (i.e., U-phase, V-phase, and W-phase) windings, and a rotor rotating with a motor shaft 45 as one body. The rotor is rotated while attracted by a rotating magnetic field generated by energization of the windings.

The encoder 32 is constituted by a magnetic rotary encoder, for example, and detects a rotation angle of the motor shaft 45. The encoder 32 outputs A-phase pulse signal and B-phase pulse signal to the shift range control apparatus 34 in synchronization with rotation of the motor shaft 45.

The output shaft sensor 33 is constituted by a potentiometer, for example, and detects a rotation angle of the output shaft 35. The output shaft sensor 33 outputs a signal corresponding to the rotation angle of the output shaft 35 to the shift range control apparatus 34. The output signal of the output shaft sensor 33 is used to check a current shift range.

The shift range control apparatus 34 includes an electronic control unit (ECU) 47 constituted by a microcomputer as a main body, and a drive circuit 48 which includes an inverter for controlling energization of the windings of the motor 41. The ECU 47 counts A-phase and B-phase pulse signals output from the encoder 32, and generates and outputs a drive signal for the drive circuit 48 in accordance with a count value of the counted pulse signals (hereinafter referred to as encoder count value). The drive circuit 48 appropriately changes an energization state of the windings of the motor 41 by operating switching elements of the inverter in accordance with the drive signal. The encoder count value corresponds to an actual angle of the motor shaft 45.

(Shift Range Control Apparatus)

The detailed configuration of the ECU 47 of the shift range control apparatus 34 will be described with reference to FIGS. 3 and 4.

Figure 3:
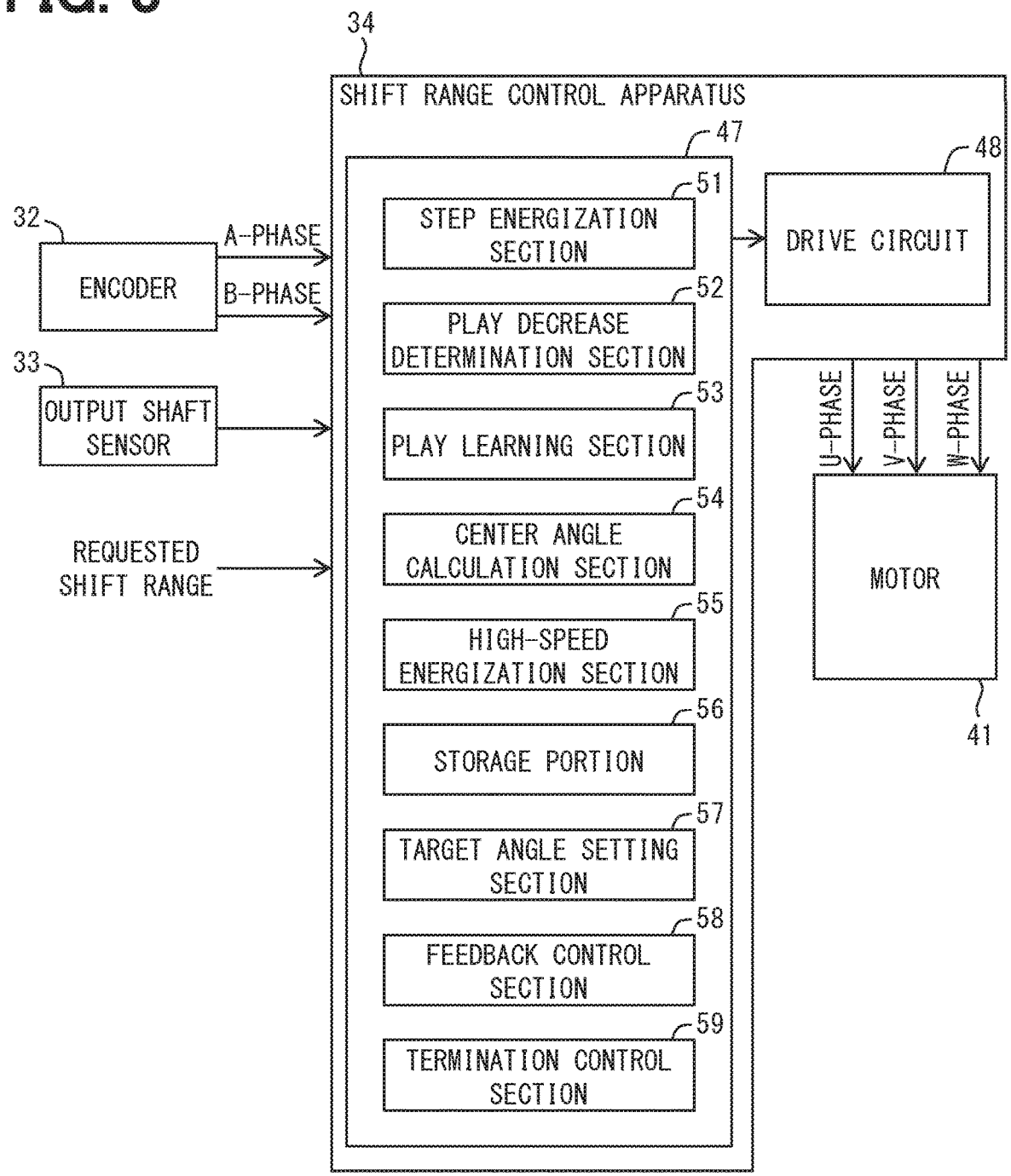
FIG. 3 is a diagram explaining function sections of an ECU of the shift range control apparatus in FIG. 1.

As shown in FIG. 3, the ECU 47 executes play learning control, normal control, and termination control.

The play learning control is a control executed when the shift range control apparatus 34 is powered on. The play learning control is control for learning play (also referred to as allowance) of the rotation transmission system from the motor shaft 45 to the output shaft 35. The play of the rotation transmission system is hereinafter simply referred to as a "play". The play learning control learns a play decrease angle and a play width.

The normal control is a control executed after execution of the play learning control in the power-on state of the shift range control apparatus 34. The normal control is control for rotating the motor 41 in accordance with a requested shift range to switch the shift range.

The termination control is control executed when the shift range control apparatus 34 is powered off. The termination control is control for preparing the play learning control for a next startup.

Specifically, the ECU 47 includes a step energization section 51, a play decrease determination section 52, a play learning section 53, a center angle calculation section 54, and a high-speed energization section 55 as function sections for executing the play learning control.

In the play learning control, the step energization section 51 switches an energization phase of the motor 41 for one step of a predetermined energization pattern to one rotation direction or the other rotation direction of the motor 41 in accordance with an encoder count value. Energization is held for a predetermined time every time the energization phase for one step is switched. This predetermined time may be referred to as "energization holding time".

Figure 4:
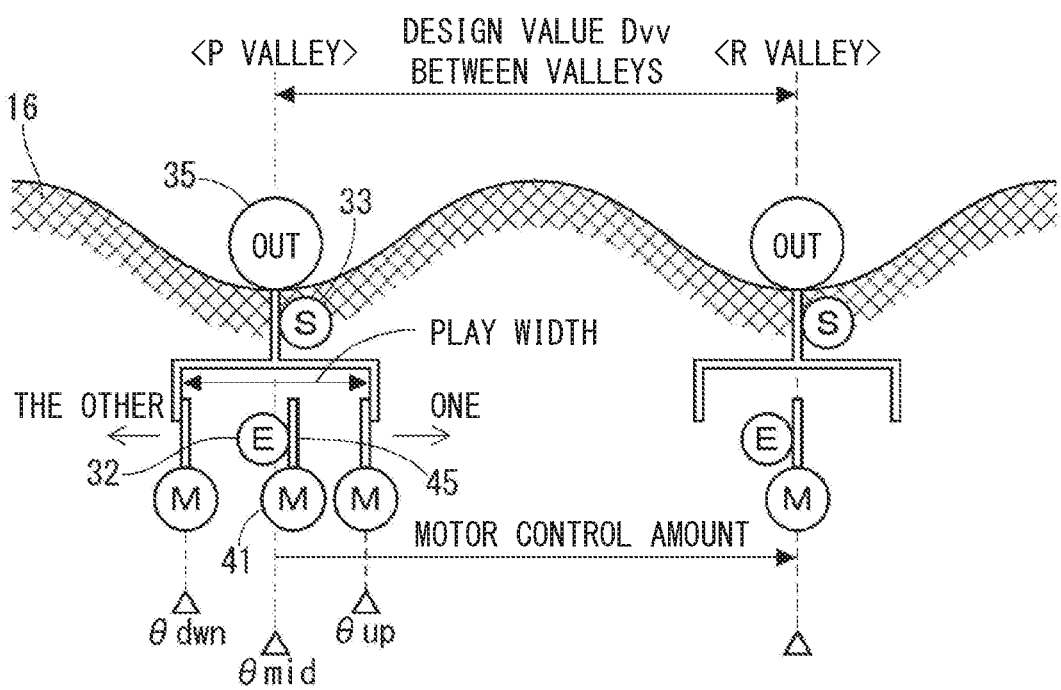
FIG. 4 is a schematic view explaining play of a rotation transmission system from a motor shaft to an output shaft of a rotary actuator in FIG. 1.

As shown in FIG. 4, the one rotation direction coincides with the rotation direction of the motor 41 at the time of switching from the parking range to the non-parking range. The other rotation direction coincides with the rotation direction of the motor 41 at the time of switching from the non-parking range to the parking range. According to the present embodiment, the motor is initially energized stepwise in the one rotation direction to intermittently rotate the motor shaft. Thereafter, the motor shaft is energized stepwise in the other rotation direction to intermittently rotate the motor shaft. One step of the energization pattern corresponds to motor resolution.

Returning to FIG. 3, the play decrease determination section 52 determines whether a detection value of the output shaft sensor 33 has changed by a predetermined value or larger before and after one-step switching of the energization phase by the step energization section 51 when a predetermined time elapses from the switching of the energization phase. This predetermined value is referred to as a "decrease determination value". The play decrease determination section 52 determines that play has decreased when the detection value of the output shaft sensor 33 changes by the decrease determination value or larger before and after the switching of the energization phase.

When the play decrease determination section 52 determines that the detection value of the output shaft sensor 33 has changed by the decrease determination value or larger before and after the switching of the energization phase, the play learning section 53 learns an angle of the motor shaft 45 at that time as a play decrease angle.

When it is determined that play has been reduced during stepping rotation in the one rotation direction, an angle of the motor shaft 45 at that time is learned as a first play decrease angle $\theta up$ as shown in FIG. 4. In other words, the first play decrease angle $\theta up$ is an angle of the motor shaft 45 when the play decreases in the one rotation direction.

When it is determined that the play has decreased during stepping rotation in the other rotation direction, an angle of the motor shaft 45 at that time is learned as a second play decrease angle $\theta dwn$. In other words, the second play decrease angle $\theta dwn$ is an angle of the motor shaft 45 when the play decreases in the other rotation direction.

Returning to FIG. 3, the first play decrease angle $\theta up$ and the second play decrease angle $\theta dwn$ are stored in a storage portion 56. The storage portion 56 retains stored contents even after the shift range control apparatus 34 is powered off.

The center angle calculation section 54 calculates an angle $\theta mid$ (hereinafter referred to as play center angle $\theta mid$), which is an angle when the motor shaft 45 is positioned at the center of play, based on the first play decrease angle $\theta up$ and the second play decrease angle $\theta dwn$. The play center angle $\theta mid$ is expressed by Equation (1).

$$\theta mid = (\theta up + \theta dwn)/2 \qquad \text{Equation (1)}$$

After the play learning section 53 learns the first play decrease angle $\theta up$, the high-speed energization section 55 rotates the motor 41 in the other rotation direction to a position close to the second play decrease angle $\theta dwn$ at a speed higher than the rotation speed of the motor 41 at switching of the energization phase by the step energization section 51 in the other rotation direction, before the switching of the energization phase by the step energization section 51. A motor rotation amount at that time corresponds to a minimum design value of play. The motor 41 is rotationally driven by energization switching control which sequentially switches the energization phase in accordance with the encoder count value.

The ECU 47 further has a target angle setting section 57 and a feedback control section 58 as function sections for executing the normal control. The target angle setting section 57 sets a target angle of the motor shaft 45 with reference to the play center angle $\theta mid$ in accordance with the requested shift range. The target angle $\theta^*$ is expressed by Equation (2). In Equation (2), Dvv is a design value (hereinafter referred to as design value between valleys) between the recess corresponding to the current shift range and the recess corresponding to the requested shift range in the recesses of the detent plate 16.

$$\theta^* = \theta mid + Dvv \qquad \text{Equation (2)}$$

The feedback control section 58 rotates the motor 41 by feedback control based on the encoder count value and a motor rotation speed to position the motor shaft 45 at a target angle.

The ECU 47 further includes a termination control section 59 as a function section for executing the termination control. The termination control section 59 rotates the motor 41 to obtain an angle of the motor shaft 45 close to the first play decrease angle $\theta up$. For example, the target angle at that time is set to a position shifted backward by several steps in the other rotation direction from the first play decrease angle $\theta up$.

The respective function sections 51 to 59 included in the ECU 47 may be implemented by hardware processing using a dedicated electronic circuit, may be implemented by software processing using a central processing unit (CPU) which executes programs stored in a read-only memory (ROM) or the like beforehand, or may be implemented by a combination of both the hardware processing and software processing. Which part of the function sections 51 to 59 is implemented by hardware processing, and which part of the function sections 51 to 59 is implemented by software processing may be selected in an appropriate manner.

(Processes Executed by ECU)

Figure 5:
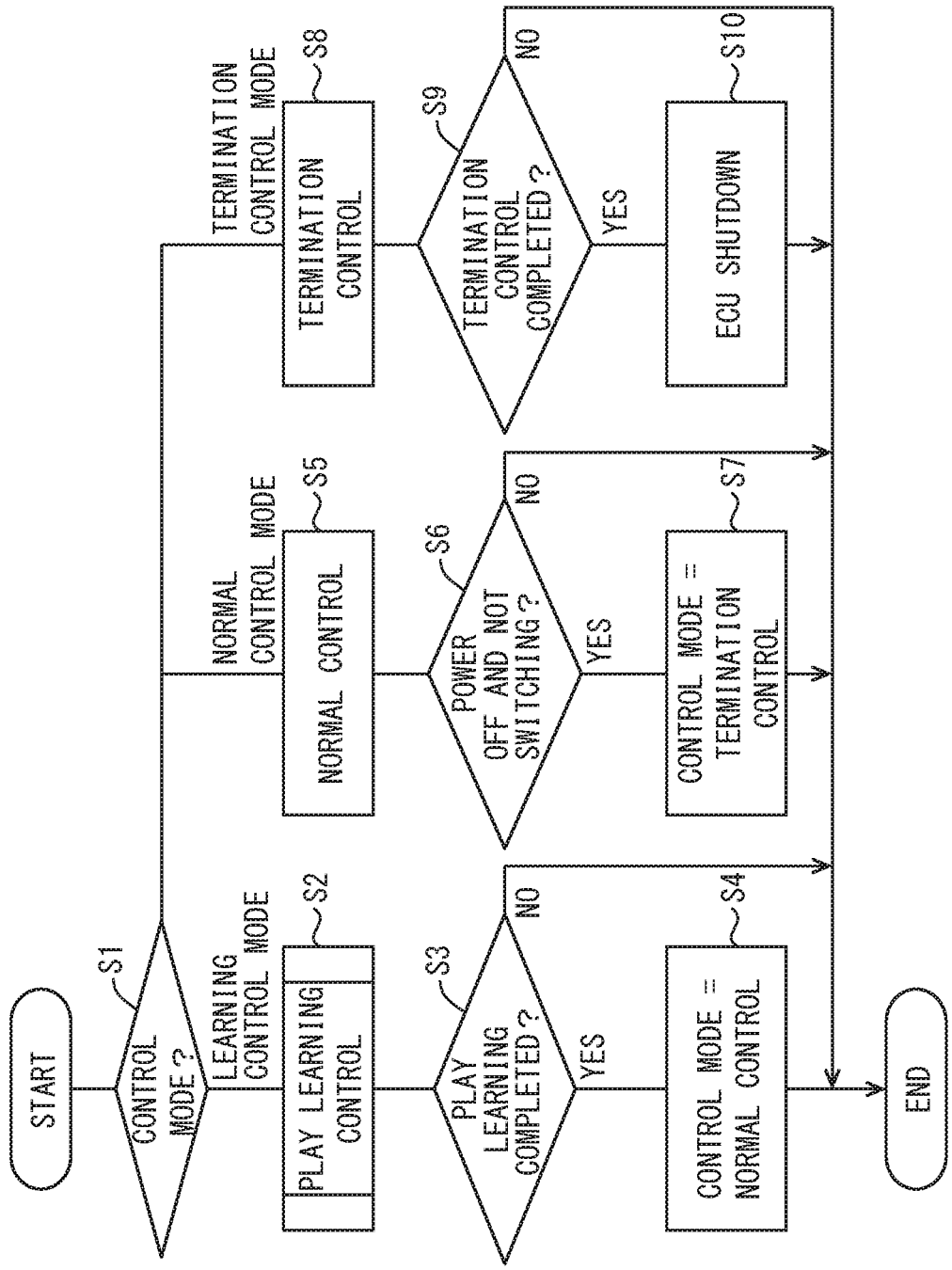
FIG. 5 is a main flowchart explaining a process executed by the ECU in FIG. 3.

A series of processes executed by the ECU 47 will be now described with reference to FIGS. 5 to 10. The ECU 47 executing a main routine shown in FIG. 5 calls and executes subroutines shown in FIGS. 6 to 8. The main routine shown in FIG. 5 is repeatedly executed after a startup of the ECU 47. In the following description, "S" indicates a step.

After a start of the main routine in FIG. 5, it is determined in 51 which of the learning control mode, the normal control mode, and the termination control mode has been currently set.

When the control mode is the learning control mode, the process proceeds to S2.

When the control mode is the normal control mode, the process proceeds to S5.

When the control mode is the termination control mode, the process proceeds to S8.

Figure 6:
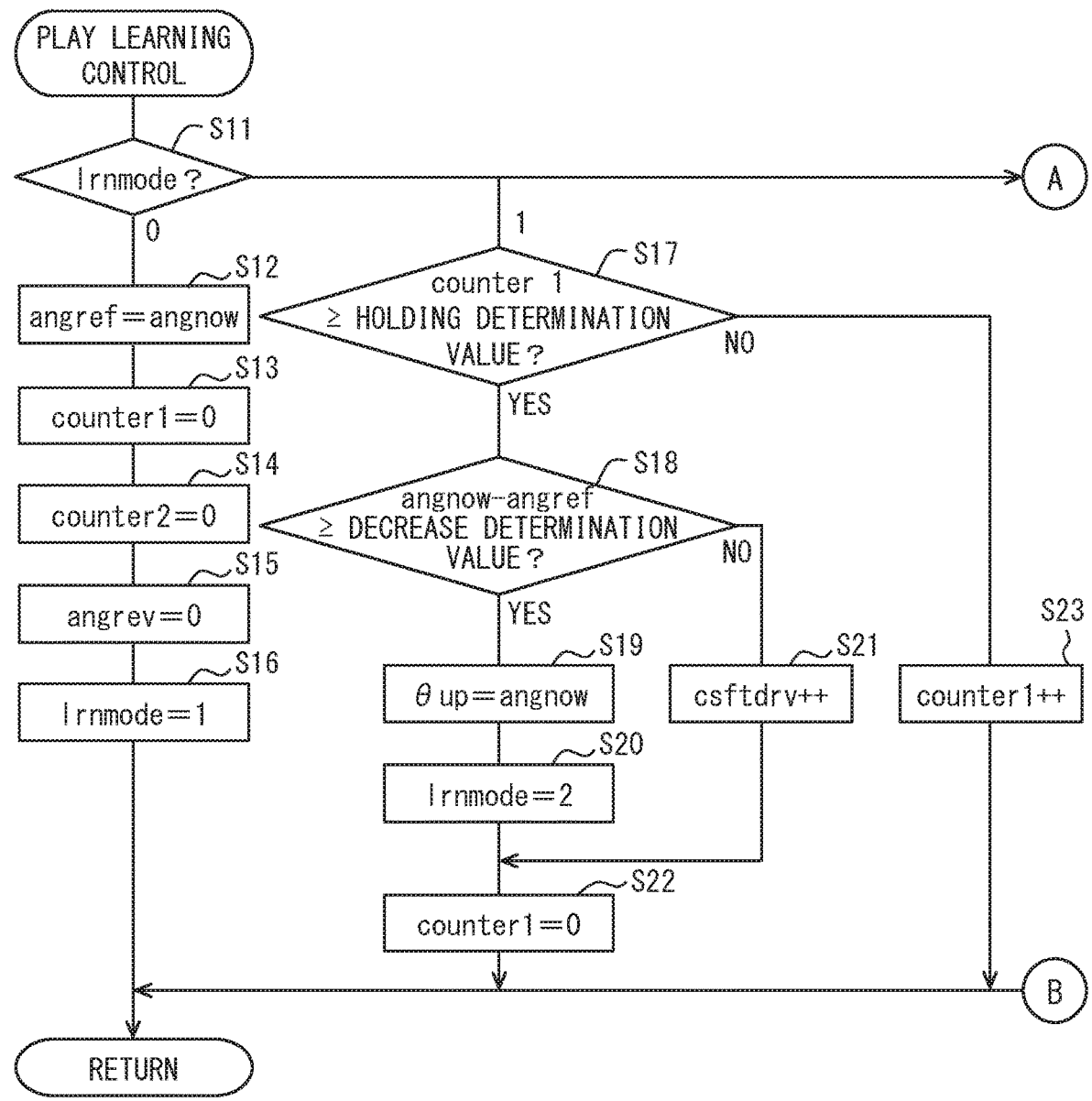
FIG. 6 is a first sub-flowchart explaining the process executed by the ECU in FIG. 3.
Figure 7:
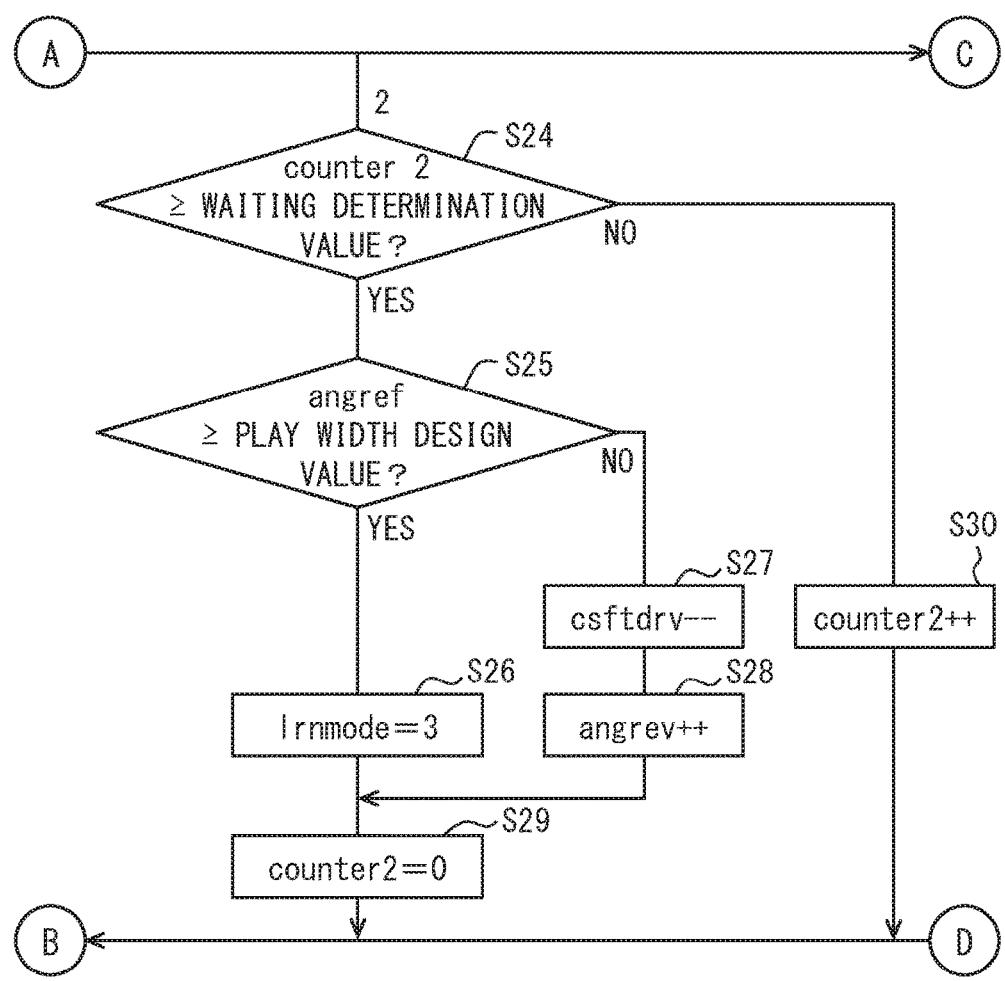
FIG. 7 is a second sub-flowchart explaining the process executed by the ECU in FIG. 3.
Figure 8:
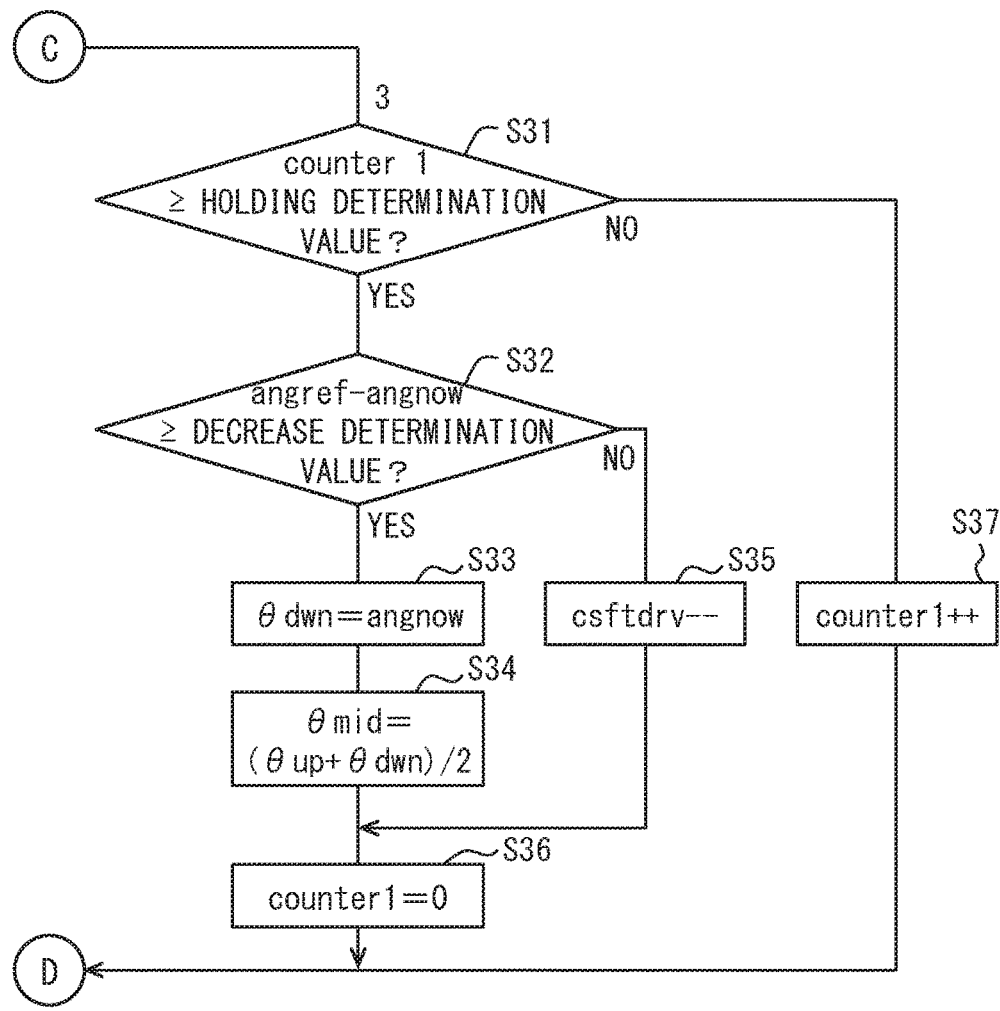
FIG. 8 is a third sub-flowchart explaining the process executed by the ECU in FIG. 3.

In S2, a subroutine for the play learning control shown in FIGS. 6 to 8 is executed.

After a start of the subroutine in FIG. 6 (corresponding to time t1 in FIG. 9), it is determined in S11 which of 0 to 3 has been currently set for a learning mode lrnmode.

When the learning mode lrnmode is 0, the process proceeds to S12.

When the learning mode lrnmode is 1, the process proceeds to S17.

When the learning mode lrnmode is 2, the process proceeds to S24.

When the learning mode lrnmode is 3, the process proceeds to S31.

S12 to S15 are processes for initial setting.

In S12, a comparison reference angle angref is set to an actual angle angnow of the motor shaft 45. After S12, the process proceeds to S13.

In S13, a first counter counter1, which is a counter for measuring an elapsed time from switching of the energization phase for one step by the step energization section 51, is reset to zero. After S13, the process proceeds to S14.

In S14, a second counter counter2, which is a counter for measuring an elapsed time from switching of the energization phase for one step by the high-speed energization section 55, is reset to zero. After S14, the process proceeds to S15.

In S15, a rotation amount angrev during reverse rotation of the motor by the high-speed energization section 55 is reset to zero. After S15, the process proceeds to S16.

In S16, the learning mode lrnmode is set to 1. After S16, the process exits from the subroutine in FIG. 6, and returns to the main routine in FIG. 5.

In S17, it is determined whether the first counter counter1 is equal to or larger than a holding determination value. The holding determination value is a value corresponding to the energization holding time.

When the first counter counter1 is equal to or larger than the holding determination value (S17: YES), the process proceeds to S18.

When the first counter counter1 is smaller than the holding determination value (S17: NO), the process proceeds to S23.

In S18, it is determined whether a difference between the actual angle angnow and the comparison reference angle angref is equal to or larger than a decrease determination value.

Figure 9:
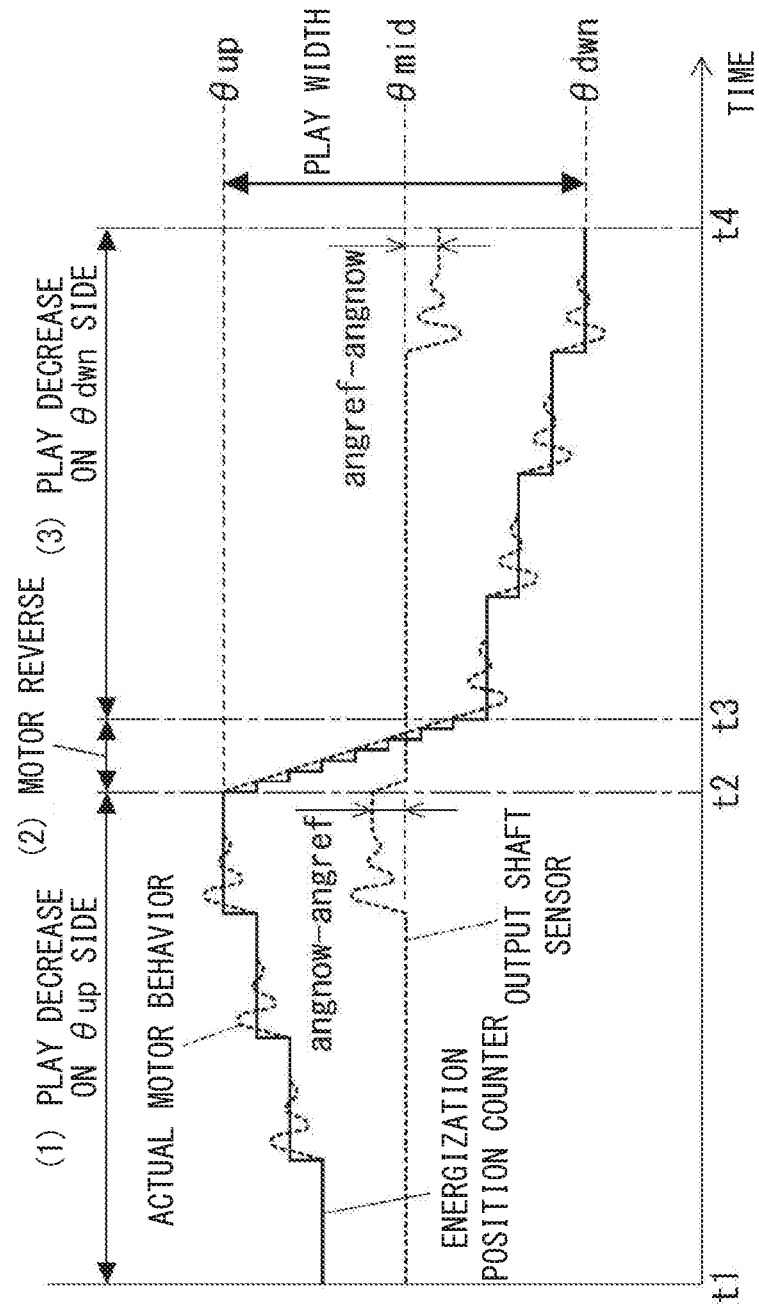
FIG. 9 is a time chart showing a transition of detection values of an energization position counter, an actual motor behavior, and an output shaft sensor when play learning control is executed by the ECU in FIG. 3.

When the difference between the actual angle angnow and the comparison reference angle angref is equal to or larger than the decrease determination value (S18: YES, corresponding to time t2 in FIG. 9), the process proceeds to S19. A period from time t1 to time t2 in FIG. 9 is a period when the step energization section 51 decreases play on the first play decrease angle θup side.

When the difference between the actual angle angnow and the comparison reference angle angref is smaller than the decrease determination value (S18: NO), the process proceeds to S21.

In S19, the actual angle angnow is learned as the first play decrease angle θup. After S19, the process proceeds to S20.

In S20, the learning mode lrnmode is set to 2. After S20, the process proceeds to S22.

In S21, an energization position counter csftdrv is counted up. After the energization position counter csftdrv is counted up, the energization phase is switched for one step to the one rotation direction. After S21, the process proceeds to S22.

In S22, the first counter counter1 is reset to zero. After S22, the process exits from the subroutine in FIG. 6, and returns to the main routine in FIG. 5.

In S24 in FIG. 7, it is determined whether the second counter counter2 is equal to or larger than a predetermined waiting determination value. The waiting determination value is a value corresponding to a waiting time for next switching of the energization phase by the high-speed energization section 55.

When the second counter counter2 is equal to or larger than the waiting determination value (S24: YES), the process proceeds to S25.

When the second counter counter2 is smaller than the waiting determination value (S24: NO), the process proceeds to S30.

In S25, it is determined whether the rotation amount angrev during reverse rotation of the motor is equal to or larger than a minimum design value of the play width.

When the rotation amount angrev is equal to or larger than the minimum design value of the play width (S25: YES, corresponding to time t3 in FIG. 9), the process proceeds to S26. A period from time t2 to time t3 in FIG. 9 is a period when the high-speed energization section 55 rotates the motor, i.e., carries out reverse rotation of the motor.

When the rotation amount angrev is smaller than the minimum design value of the play width (S25: NO), the process proceeds to S27.

In S26, the learning mode lrnmode is set to 3. After S26, the process proceeds to S29.

In S27, the energization position counter csftdrv is counted down. After the energization position counter csftdrv is counted down, the energization phase is switched for one step to the other rotation direction. After S27, the process proceeds to S28.

In S28, the rotation amount angrev during reverse rotation of the motor is counted up. After S28, the process proceeds to S29.

In S29, the second counter counter2 is reset to zero. After S29, the process exits from the subroutine in FIG. 7, and returns to the main routine in FIG. 5.

In S30, the second counter counter2 is counted up. After S30, the process exits from the subroutine in FIG. 7, and returns to the main routine in FIG. 5.

In S31 in FIG. 8, it is determined whether the first counter counter1 is equal to or larger than the holding determination value.

When the first counter counter1 is equal to or larger than the holding determination value (S31: YES), the process proceeds to S32.

When the first counter counter1 is smaller than the holding determination value (S31: NO), the process proceeds to S37.

In S32, it is determined whether a difference between the comparison reference angle angref and the actual angle angnow is equal to or larger than the decrease determination value.

When the difference between and the comparison reference angle angref and the actual angle angnow is equal to or larger than the decrease determination value (S32: YES, corresponding to time t4 in FIG. 9), the process proceeds to S33. A period from time t3 to time t4 in FIG. 9 is a period when the step energization section 51 decreases play on the second play decrease angle θdwn side.

When the difference between the comparison reference angle angref and the actual angle angnow is smaller than the decrease determination value (S32: NO), the process proceeds to S35.

In S33, the actual angle angnow is learned as the second play decrease angle θdwn. After S33, the process proceeds to S34.

In S34, the play center angle θmid is calculated based on Equation (1). After S34, the process proceeds to S36.

In S35, the energization position counter csftdrv is counted down. After S35, the process proceeds to S36.

In S36, the first counter counter1 is reset to zero. After S36, the process exits from the subroutine in FIG. 8, and returns to the main routine in FIG. 5.

In S37, the first counter counter1 is counted up. After S37, the process exits from the subroutine in FIG. 7, and returns to the main routine in FIG. 5.

Returning to FIG. 5, it is determined in S3 whether the play learning has been completed, that is, whether the first play decrease angle θup and the second play decrease angle θdwn have been learned.

When it is determined that the play learning has been completed (S3: YES), the process proceeds to S4.

When it is determined that the play learning has not been completed (S3: NO), the process ends the main routine in FIG. 5.

In S4, the control mode is set to the normal control mode. After S4, the process ends the main routine in FIG. 5.

In S5, the normal control is performed. More specifically, a target angle of the motor shaft 45 is established with reference to the play center angle θmid in accordance with a requested shift range. Thereafter, the motor 41 is rotationally driven by feedback control based on the encoder count value and the motor rotation speed to position the motor shaft 45 at the target angle. After S5, the process proceeds to S6.

In S6, it is determined whether a shift to the termination control is permitted. A shift to the termination control is permitted when a power-off command is issued from the ECU 47 in a state other than shift range switching.

When a shift to the termination control is permitted (S6: YES), the process shifts to S7.

When a shift to the termination control is not permitted (S6: NO), the process ends the main routine in FIG. 5.

In S7, the control mode is set to the termination control mode. After S7, the process ends the main routine in FIG. 5.

Figure 10:
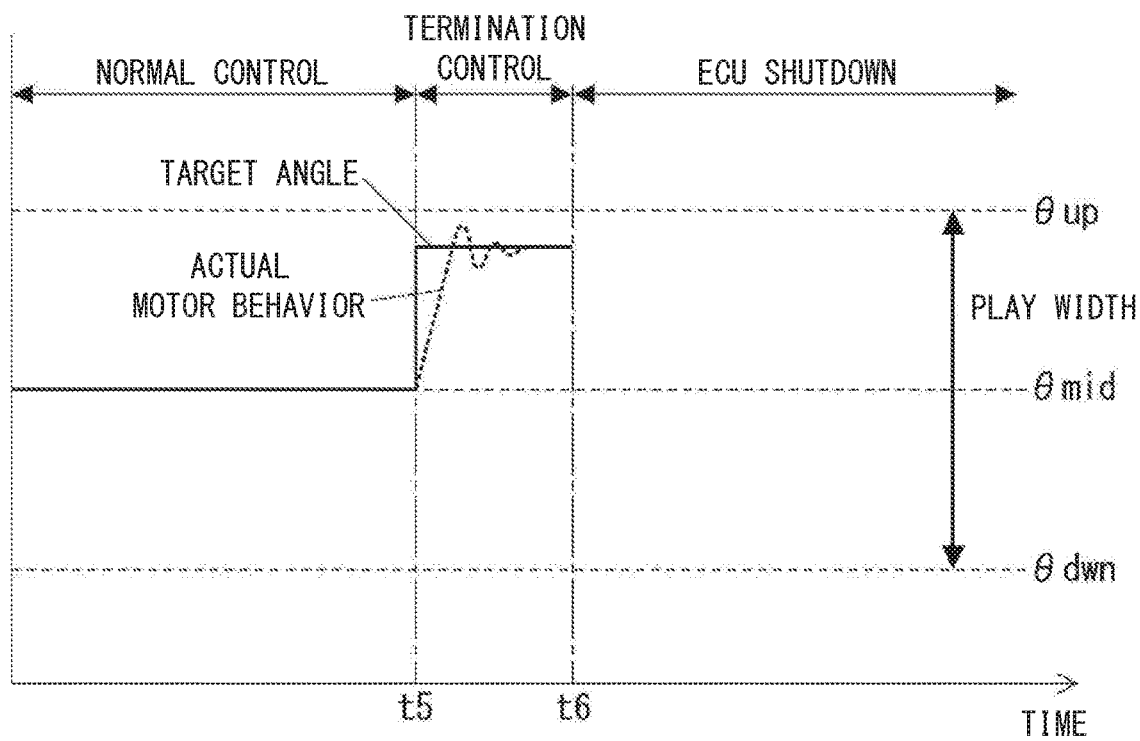
FIG. 10 is a time chart showing a transition of detection values of an energization position counter, an actual motor behavior, and an output shaft sensor when termination control is executed by the ECU in FIG. 3.

In S8, the termination control is executed (corresponding to time t5 in FIG. 10). More specifically, the motor 41 is rotationally driven to obtain an angle of the motor shaft 45 close to the first play decrease angle θup. After S8, the process proceeds to S9.

In S9, it is determined whether the termination control has been completed, i.e., whether the angle of the motor shaft 45 is close to the first play decrease angle θup.

When it is determined that the termination control has been completed (S9: YES, corresponding to time t6 in FIG. 10), the process proceeds to S4.

When it is determined that the termination control has not been completed (S9: NO), the process ends the main routine in FIG. 5.

In S10, the ECU 47 is shut down. After S7, the process ends the main routine in FIG. 5.

As described above, the shift range control apparatus 34 of the first embodiment includes the step energization section 51, the play decrease determination section 52, and the play learning section 53.

The step energization section 51 switches the energization phase of the motor 41 for one step of the predetermined energization pattern to the one rotation direction or the other rotation direction of the motor 41 in the control for learning the play decrease angle, which is an angle when play of the rotation transmission system from the motor shaft 45 to the output shaft 35 decreases.

The play decrease determination section 52 determines whether a detection value of the output shaft sensor 33 has changed by a predetermined value or larger before and after switching of the energization phase by the step energization section 51 when a predetermined time elapses from the switching of the energization phase.

When the play decrease determination section 52 determines that the detection value of the output shaft sensor 33 has changed by the predetermined value or larger before and after the switching of the energization phase, the play learning section 53 learns an angle of the motor shaft 45 at that time as a play decrease angle.

As described above, a change of the detection value of the output shaft sensor 33 is checked after switching of the energization phase of the motor 41 for one step of the energization pattern and convergence of swings of the rotation transmission system. In this case, the play decrease angle is accurately detectable for each step of the energization pattern. One step of the energization pattern corresponds to motor resolution, wherefore a play decrease angle is detectable with accuracy of motor resolution. Accordingly, detection accuracy of play decrease angles improves.

According to the first embodiment, the play learning section 53 learns the first play decrease angle θup and the second play decrease angle θdwn. The shift range control apparatus 34 further includes the center angle calculation section 54. The center angle calculation section 54 calculates the play center angle θmid based on the first play decrease angle θup and the second play decrease angle θdwn.

Accordingly, it may be possible to improve learning accuracy of the play center angle θmid.

According to the first embodiment, the shift range control apparatus 34 further includes the high-speed energization section 55. After the play learning section 53 learns the first play decrease angle θup, the high-speed energization section 55 rotates the motor 41 in the other rotation direction to a position close to the second play decrease angle θdwn at a speed higher than the rotation speed of the motor 41 at switching of the energization phase by the step energization section 51 in the other rotation direction, before the switching of the energization phase by the step energization section 51.

Accordingly, it may be possible to shorten a time required for the learning control.

According to the first embodiment, the shift range control apparatus 34 further includes the target angle setting section 57. The target angle setting section 57 sets a target angle of the motor shaft 45 with reference to the play center angle θmid in the control for rotating the motor 41 in accordance with a requested shift range.

Accordingly, it may be possible to improve the positioning accuracy of the output shaft 35, and also to simplify a motor control logic.

According to the first embodiment, the shift range control apparatus 34 further includes the termination control section 59. The termination control section 59 rotates the motor 41 to obtain an angle of the motor shaft 45 close to the first play decrease angle θup in the control executed when the shift range control apparatus 34 is powered off.

It may be possible to shorten a time required for the play learning control for a next startup by shifting the motor shaft 45 toward the first play decrease angle θup beforehand in this manner.

Second Embodiment

Figure 11:
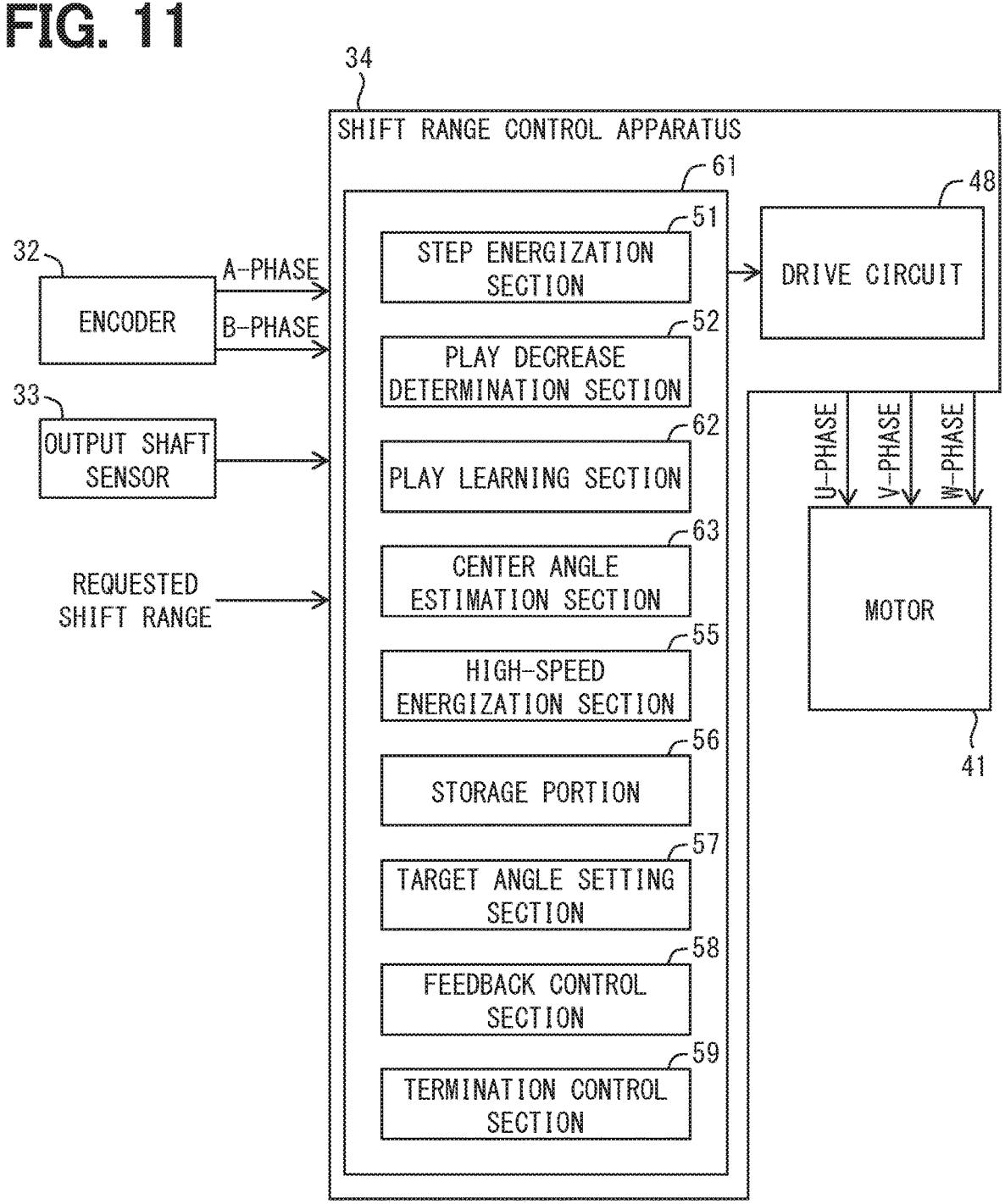
FIG. 11 is a diagram explaining function sections included in an ECU of a shift range control apparatus according to a second embodiment.

According to the second embodiment, a play learning section 62 of an ECU 61 learns the first play decrease angle θup, but does not learn the second play decrease angle θdwn as shown in FIG. 11. The ECU 61 includes a center angle estimation section 63. The center angle estimation section 63 estimates the play center angle θmid based on the first play decrease angle θup and a design value of the play width (referred to as play width design value). Equation (3) shown below is used for estimation.

θmid=θup−(play width design value/2)  (Equation 3)

In this case, the process for learning the second play decrease angle θdwn is unnecessary, i.e., the processes in S24 to S30 in FIG. 7 and S31 to S37 in FIG. 8 in the first embodiment are unnecessary. Accordingly, the learning control is completed at time t2 in FIG. 9 in the first embodiment, and thereby it may be possible to shorten the time required for play learning.

Third Embodiment

Figure 12:
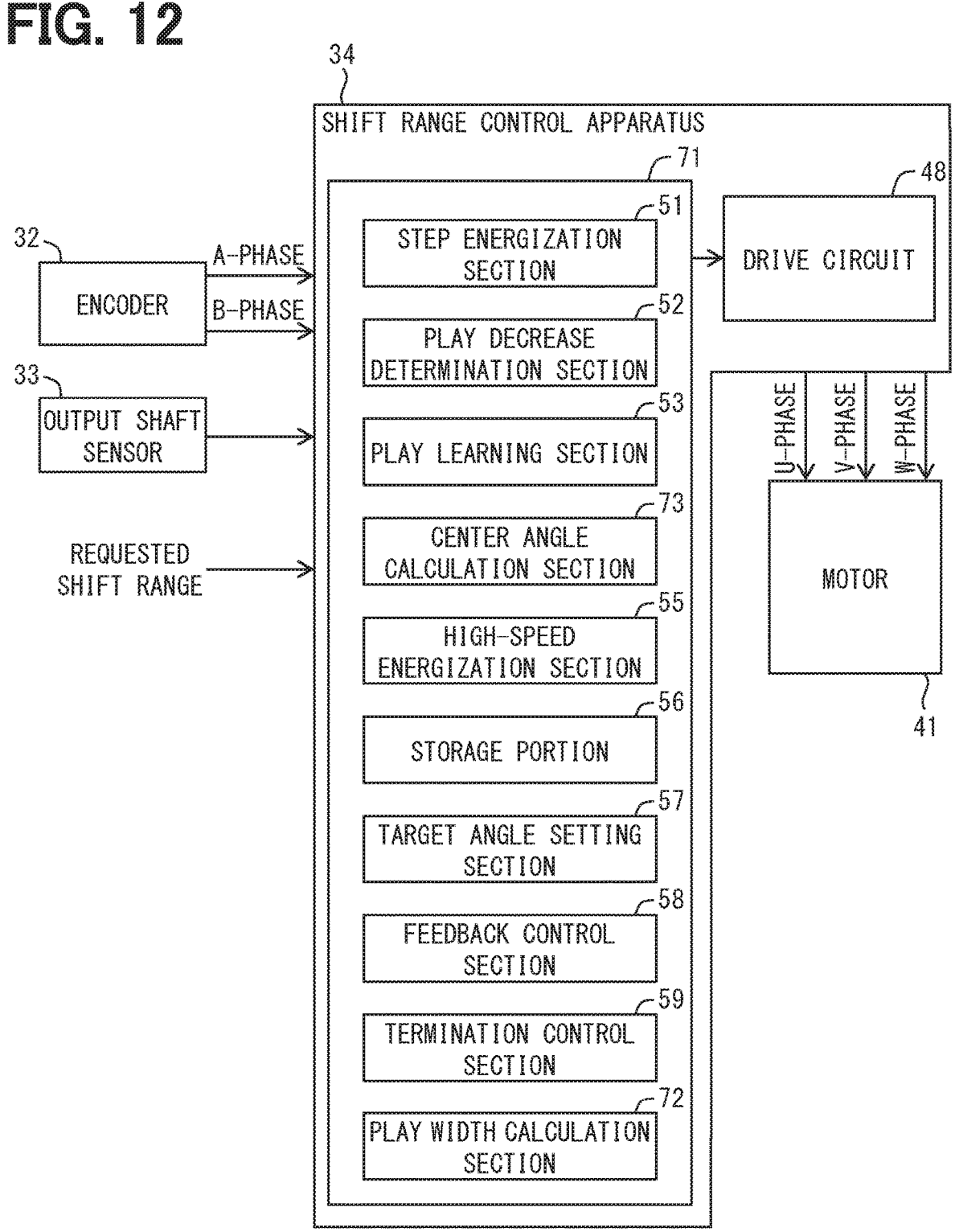
FIG. 12 is a diagram explaining function sections included in an ECU of a shift range control apparatus according to a third embodiment.

According to a third embodiment, an ECU 71 includes a play width calculation section 72 and a center angle calculation section 73 as shown in FIG. 12. The play width calculation section 72 calculates a play width (referred to as calculated play width) based on the first play decrease angle θup and the second play decrease angle θdwn. The storage portion 56 stores the calculated play width.

When the calculated play width is not stored in storage portion 56 (i.e., at initial learning), the center angle calculation section 73 calculates the play center angle θmid based on the first play decrease angle θup and the second play decrease angle θdwn. This calculation is performed using Equation (1) described above.

When the calculated play width is stored in storage portion 56 (i.e., at second and subsequent learning), the center angle calculation section 73 calculates the play center angle θmid based on the first play decrease angle θup and the calculated play width. This calculation is performed using Equation (4) shown below.

θmid=θup−(calculated play width/2)  (Equation 4)

By calculating the play center angle θmid in this manner, it may be possible to shorten the time required for the second and subsequent play learning with improvement of learning accuracy of the play center angle θmid.

Fourth Embodiment

Figure 13:
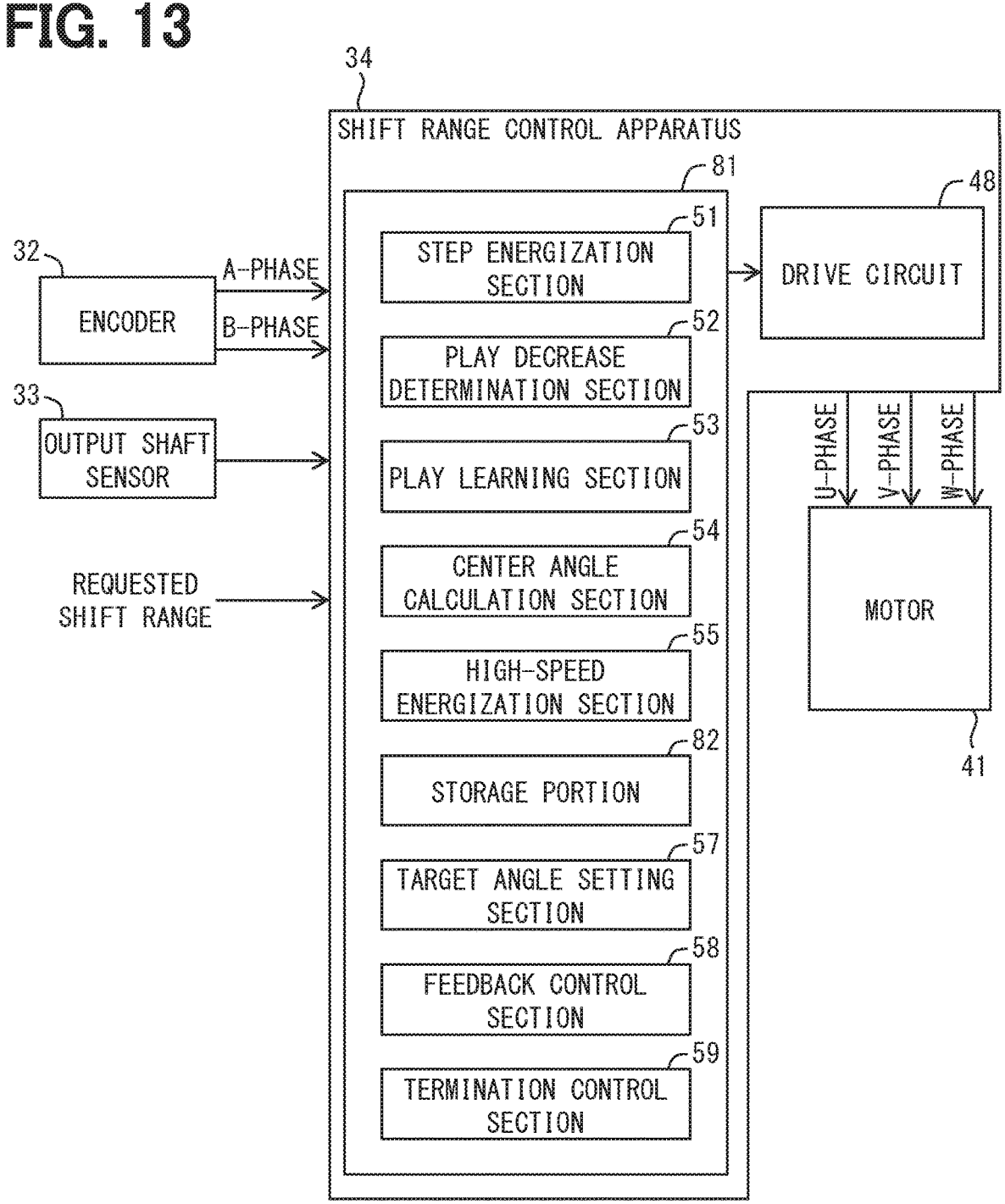
FIG. 13 is a diagram explaining function sections included in an ECU of a shift range control apparatus according to a fourth embodiment.

According to a fourth embodiment, a storage portion 82 of an ECU 81 stores a difference between a current angle of the motor shaft 45 and the first play decrease angle θup in the control executed when the shift range control apparatus 34 is powered off as shown in FIG. 13.

In this case, it may be possible to start the play learning control after the motor shaft 45 is quickly moved toward the first play decrease angle θup. Accordingly, it may be possible to shorten a time required for the play learning control at a next startup.

Other Embodiments

In a different embodiment, one step of the energization pattern performed by the step energization section may be larger than motor resolution. For example, one step of the energization pattern may be twice larger than motor resolution.

In a different embodiment, the high-speed energization section may rotationally drive the motor by feedback control.

In a different embodiment, the termination control section may rotationally drive the motor by energization switching control. The termination control section may designate the first play decrease angle as a target angle at the time of rotation of the motor.

According to the first embodiment, the play decrease determination section 52 checks a change of a detection value of the output shaft sensor 33 after an elapse of a predetermined time from one-step switching of the energization phase by the step energization section 51. According to a different embodiment, however, the play decrease determination section may check the detection value of the output shaft sensor after switching of the energization phase by the step energization section and convergence of swings of the detection value of the motor shaft sensor or the output shaft sensor.

In another embodiment, the motor may be provided with multiple multi-phase windings. The motor is not limited to a DC brushless motor or a switched reluctance motor, and may be another type of motor. In short, any motor for rotating a rotor by switching an electricity supply phase according to a predetermined electricity supply pattern may be used.

In other embodiments, the encoder may be a type other than magnetic. Also, the encoder may output three or more signals.

In other embodiments, the output axis sensor is not limited to a potentiometer, but may be another type of sensor. In short, any output axis sensor that outputs signals continuously changing in accordance with the rotation angle of the output shaft may be used.

The present disclosure is not limited to the described embodiments, and can be implemented in various modes without departing from the scope of the disclosure.

The present disclosure has been described based on the embodiments. However, the present disclosure is not limited to such embodiments and configurations. That is, the present disclosure also encompasses various modifications and variations within the scope of equivalents. Furthermore, various combination and formation, and other combination and formation including one, more than one or less than one element may be made in the present disclosure.

The invention claimed is:

1. A shift range control apparatus that switches a shift range by controlling a motor, and is applied to a vehicle shift-by-wire system including
a rotary actuator connected to a shift range switching mechanism,
a motor shaft sensor detecting an angle of a motor shaft of the motor of the rotary actuator, and
an output shaft sensor detecting an angle of an output shaft of the rotary actuator,
the shift range control apparatus comprising:
a step energization section that switches an energization phase of the motor for one step of a predetermined energization pattern to one rotation direction or a different rotation direction of the motor in a control for learning a play decrease angle, the play decrease angle being an angle when a play of a rotation transmission system from the motor shaft to the output shaft decreases;
a play decrease determination section that determines whether a detection value of the output shaft sensor has changed by a predetermined value or larger before and after switching of the energization phase for one step by the step energization section when a predetermined time elapses from the switching of the energization phase for the one step, or when swings of the detection value of the motor shaft sensor or the output shaft sensor converge after the switching of the energization phase for the one step; and a play learning section that learns, as the play decrease angle, an angle of the motor shaft when the play decrease determination section determines that the detection value of the output shaft sensor has changed by the predetermined value or larger before and after the switching of the energization phase.

2. The shift range control apparatus according to claim 1, wherein:

an angle of the motor shaft when the play decreases in the one rotation direction is a first play decrease angle;

an angle of the motor shaft when the play decreases in the different rotation direction is a second play decrease angle;

an angle when the motor shaft is positioned at a center of the play is a play center angle;

the play learning section learns the first play decrease angle and the second play decrease angle; and the shift range control apparatus further comprises a center angle calculation section that calculates the play center angle based on the first play decrease angle and the second play decrease angle.

3. The shift range control apparatus according to claim 2, further comprising:

a high-speed energization section that rotates the motor in the different rotation direction to a position close to the second play decrease angle at a speed higher than a rotation speed of the motor at switching of the energization phase by the step energization section in the different rotation direction, after the play learning section learns the first play decrease angle and before the switching of the energization phase by the step energization section.

4. The shift range control apparatus according to claim 2, further comprising:

a target angle setting section that sets a target angle of the motor shaft with reference to the play center angle in a control for rotating the motor in accordance with a requested shift range.

5. The shift range control apparatus according to claim 1, wherein an angle of the motor shaft when the play decreases in the one rotation direction is a first play decrease angle, an angle of the motor shaft when the play decreases in the different rotation direction is a second play decrease angle, an angle when the motor shaft is positioned at a center of the play is a play center angle, a width of the play is a play width, the play learning section learns the first play decrease angle and the second play decrease angle, and the shift range control apparatus further comprises:

a play width calculation section that calculates the play width based on the first play decrease angle and the second play decrease angle;

a play width storage portion that retains stored contents after the shift range control apparatus is powered off, and stores the play width; and a center angle calculation section that calculates the play center angle based on the first play decrease angle and the second play decrease angle in response to that the play width storage portion does not store the play width, or calculates the play center angle based on the first play decrease angle and the play width in response to that the play width storage portion stores the play width.

6. The shift range control apparatus according to claim 1, wherein:

an angle of the motor shaft when the play decreases in the one rotation direction is a first play decrease angle;

an angle of the motor shaft when the play decreases in the different rotation direction is a second play decrease angle;

an angle when the motor shaft is positioned at a center of the play is a play center angle;

a width of the play is a play width;

the play learning section learns the first play decrease angle without learning the second play decrease angle; and the shift range control apparatus further comprises a center angle estimation section that estimates the play center angle based on the first play decrease angle and a design value of the play width.

7. The shift range control apparatus according to claim 1, wherein:

the one rotation direction is a rotation direction of the motor when a parking range is switched to a non-parking range; and the shift range control apparatus further comprises a termination control section that rotates the motor in a control executed when the shift range control apparatus is powered off, causing the angle of the motor shaft to be an angle or an angle close to the play decrease angle when the play decreases in the one rotation direction.

8. The shift range control apparatus according to claim 1, further comprising:

a difference storage portion that retains stored contents after the shift range control apparatus is powered off, and stores a difference between a current angle of the motor shaft and the play decrease angle in a control executed when the shift range control apparatus is powered off.

9. A shift range control apparatus that switches a shift range by controlling a motor and is applied to a vehicle shift-by-wire system, the shift range control apparatus comprising:

a controller connected with a drive circuit that is configured to:

switch an energization phase of the motor for one step of a predetermined energization pattern to one rotation direction or a different rotation direction of the motor in a control for learning a play decrease angle, the play decrease angle being an angle when a play of a rotation transmission system from a motor shaft to an output shaft decreases;

determine whether a detection value of an output shaft sensor, which detects an angle of the output shaft of a rotary actuator in the vehicle shift-by-wire system, has changed by a predetermined value or larger before and after switching of the energization phase for the one step when a predetermined time elapses from the switching of the energization phase for the one step, or when swings of the detection value of a motor shaft sensor, which detects an angle of the motor shaft of the motor of the rotary actuator, or the output shaft sensor converge after the switching of the energization phase for the one step; and learn, as the play decrease angle, an angle of the motor shaft when it is determined that the detection value of the output shaft sensor has changed by the predetermined value or larger before and after the switching of the energization phase.

* * * * *